No. 697,520. Patented Apr. 15, 1902.
H. M. McCHESLEY.
NUT LOCK.
(Application filed Aug. 23, 1901.)
(No Model.)

WITNESSES:
F. A. Barron
N. L. Culley

INVENTOR
Hugh M. McChesley
BY
Milo B. Stevens & Co.
ATTORNEYS.

UNITED STATES PATENT OFFICE.

HUGH M. McCHESLEY, OF BEREA, OHIO.

NUT-LOCK.

SPECIFICATION forming part of Letters Patent No. 697,520, dated April 15, 1902.

Application filed August 23, 1901. Serial No. 73,027. (No model.)

*To all whom it may concern:*

Be it known that I, HUGH M. MCCHESLEY, a citizen of the United States, residing at Berea, in the county of Cuyahoga and State of Ohio, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to nut-locks; and it consists in a construction, arrangement, and combination of parts to be described, and defined in the claims.

The object of the invention is to provide a simple and efficient device for locking nuts upon bolts to prevent their jarring or working loose.

In the accompanying drawings I have shown my invention as applied to a bolt passing through two pieces of timber for the purpose of holding the same together; but it is obvious that my invention may be used on rail-joints, engine parts, &c., wherever it is desirable to securely lock a nut upon the bolt and prevent its jarring or working loose. Modifications and changes may be made without departing from the invention.

Figure 1:
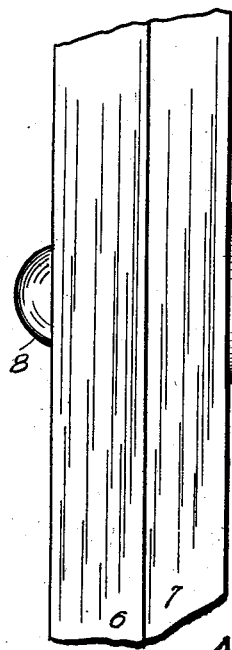
Figure 2:
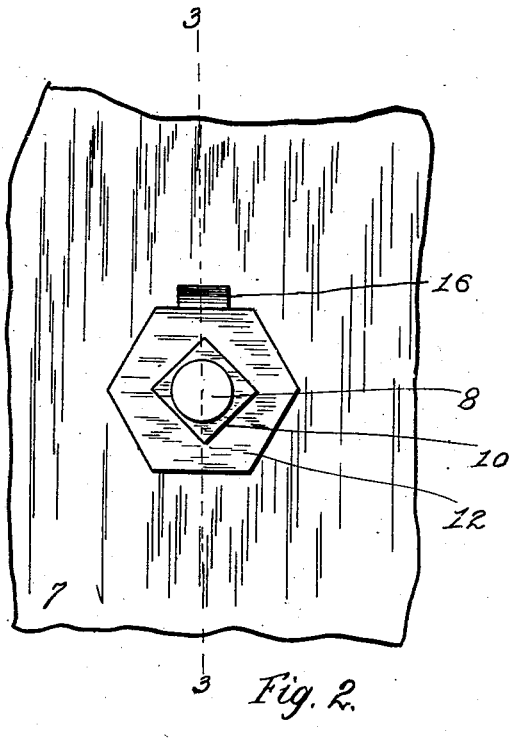
Figure 3:
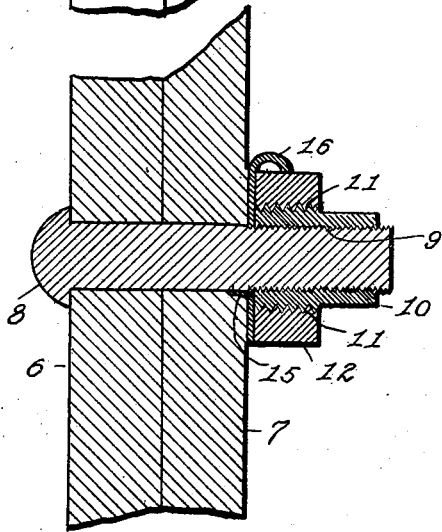
Figure 4:
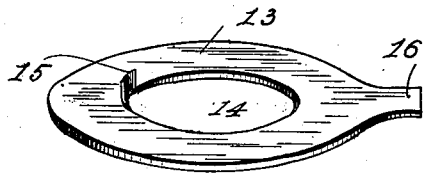

In the drawings, Figure 1 is a side elevation. Fig. 2 is a front elevation. Fig. 3 is a section on the line 3 3 of Fig. 2. Fig. 4 is a perspective view of the washer-plate.

Referring more specifically to the drawings, 6 and 7 indicate two pieces of timber, through which a bolt 8 passes. The outer portion of the bolt 8 is screw-threaded, as indicated at 9, and a nut 10 is screwed thereon. The rear portion of the nut 10 is externally screw-threaded, as indicated at 11, these threads having a greater pitch than the threads 9 on the bolt. A nut 12 is screwed on the threaded portion of the nut 10, and the rotation of this nut 12 is prevented by means of the washer-plate 13. This plate has a perforation 14 to permit the passage of the bolt 8. A projection 15 at the edge of the perforation enters an enlargement in the bolt-hole made by cutting a piece out of the wall of the same. This prevents the rotation of the washer-plate. The outer edge of the washer 13 is provided with a tongue 16, which is adapted to be turned up against the nut 12 to prevent the unscrewing of the same.

In operation the washer 13 is slipped over the bolt and the nut 10 is screwed on. The nut 12 is then screwed on the nut 10 and the tongue 16 of the washer is turned up and bent over against the nut 12, as shown in Figs. 1, 2, and 3.

Having thus described the invention, what is claimed as new, and desired to be secured by Letters Patent, is—

1. The combination of a threaded bolt, a nut screwed thereon, an external screw-thread on said nut of a greater pitch than that of the thread on the bolt, a nut screwed thereon, and means to prevent rotation of the same, substantially as shown and described.

2. In combination, a threaded bolt, a nut screwed thereon, an external screw-thread on said nut of a greater pitch than that of the thread on the bolt and adapted to receive a second nut, a washer-plate having a perforation for the passage of the bolt, a projection at the edge of the perforation to enter an enlargement of the bolt-hole and prevent rotation of the washer, and a tongue on the outer edge of the washer adapted to be turned up against the outside nut, substantially as and for the purpose described.

In testimony whereof I affix my signature in presence of two witnesses.

HUGH M. McCHESLEY.

Witnesses:
M. A. SCHMIDT,
S. A. TERRY.